United States Patent Office 3,470,137
Patented Sept. 30, 1969

3,470,137
INTER SE COPOLYMERS OF
BICYCLO[1.1.0]BUTANES
Elwood P. Blanchard, Jr., Williamsville, N.Y., assignor to
E. I. du Pont de Nemours and Company, Wilmington,
Del., a corporation of Delaware
No Drawing. Continuation-in-part of application Ser. No.
475,573, July 28, 1965. This application Feb. 14, 1967,
Ser. No. 615,919
The portion of the term of the patent subsequent to
July 16, 1985, has been disclaimed
Int. Cl. C08g 25/00
U.S. Cl. 260—78.5        7 Claims

ABSTRACT OF THE DISCLOSURE

Inter se copolymers of two or more structurally different bicyclo[1.1.0]butane monomers of the formula:

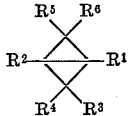

wherein the R groups are a variety of substituents. The copolymers are useful in preparing fibers, films or molded objects. The copolymers are prepared by ordinary initiator polymerization processes.

CROSS-REFERENCES TO RELATED APPLICATIONS

This application is a continuation-in-part of application Ser. No. 475,573, filed July 28, 1965, now Patent No. 3,393,159.

BACKGROUND OF THE INVENTION

Field of the invention

This invention relates to inter se copolymers of bicyclo[1.1.0]butanes.

Description of the prior art

The spontaneous homopolymerization of some bicyclo[1.1.0]butanes has led to a search for polymers of unusual properties. This search has now resulted in the production of inter se copolymers of bicyclo[1.1.0]butanes.

SUMMARY OF THE INVENTION

The novel polymers of this invention are copolymers of at least two structurally different monomers of the formula:

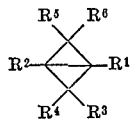

wherein:

$R^1$ and $R^2$ each are selected from hydrogen, halogen, hydroxyloweralkyl, hydroxyphenyl, loweralkoxyloweralkyl, loweralkoxyphenyl, haloloweralkyl, halophenyl, —COOH, —COOR, —COSR, —COOM, —CONH$_2$, —CONHR, —CON(R)$_2$, —SO$_2$R, —CHO, —COR$^7$, —OCOR$^7$, —OR, —NO$_2$, —CN, or —R wherein M is one equivalent of a metal cation and R is hydrocarbyl of up to 18 carbon atoms free of ethylenic or acetylenic carbon-to-carbon unsaturation; and $R^3$, $R^4$, $R^5$, and $R^6$ are each selected from hydroxy, amino, —NR$_2$, or $R^1$, and $R^7$ is hydrogen, hydrocarbyl of up to 18 carbon atoms or such hydrocarbyl group carrying 1–3 substituents selected from halogen and/or loweralkoxy.

Halogen, and its alternate form, halo, includes fluorine, chlorine, bromine, and iodine. The metal, M, includes those of atomic numbers 3, 4, 11–13, 19–32, 37–51, 55–84, 87–103. Preferred metals are those of Groups I–A, I–B, II–A, II–B, and VIII of the Periodic Table. Especially preferred metals are the alkali metals.

The term "lower," wherever used in the definitions, denotes a carbon length of 1–6 carbon atoms.

The term "hydrocarbyl free of ethylenic or acetylenic carbon-to-carbon unsaturation" means that the hydrocarbyl group is either saturated or contains only aromatic unsaturation. Thus, this term includes, e.g., alkyl, cycloalkyl, aryl, alkaryl, and aralkyl. In the definition of $R^7$ above, preferred herein are hydrocarbyl groups containing 1–12 carbon atoms and particularly those containing 1–6 carbon atoms.

Illustrative hydrocarbyl groups as defined above in the definitions of $R^1$–$R^7$ include alkyl groups such as methyl, ethyl, tertiary butyl, hexyl, isooctyl, dodecyl, octadecyl, and the like; cycloalkyl groups such as cyclopropyl, cyclobutyl, cyclopentyl, cyclohexyl, cyclooctyl, methyl, cyclohexyl, 3,5-dicyclohexylcyclohexyl, cyclooctadecyl, and the like; aryl groups such as phenyl, naphthyl, anthryl, p-phenylphenyl, p-biphenyl, naphthacenyl, benzanthryl, chrysenyl, and the like; alkaryl groups such as p-tolyl, p-cumenyl, 2,4,6-tributylphenyl, 9,10-diethyl-1-anthryl, 6-methyl-2-naphthyl, and the like; aralkyl groups such as benzyl, phenylethyl, diphenylmethyl, α-naphthylethyl, 2-(2-anthryl)ethyl, 4-(2-anthryl)butyl, and the like. Additional illustrative $R^7$ groups are alkylene groups such as vinyl, allyl, 2-butenyl, 1-octadecenyl, and the like; alkadienyl groups such as 3,7-dimethyl-2,6-octadienyl, and the like; alkynyl groups such as ethynyl, 1-hexynyl, and the like; and aralkylene groups such as styryl, cinnamyl, and the like.

Alternatively, the novel copolymers of this invention can be described as copolymers of catenarian 1,3-cyclobutylene structural units of the formula:

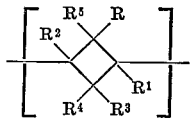

in which the R groups are defined as above and in which there is a recurring random variation in at least one of the R groups of the recurring unit corresponding to the chemically distinguishable difference or differences between or among the monomeric bicyclo[1.1.0]butanes used to prepare the copolymer. Because of the possible variations in the spacial arrangement of the R groups in the copolymers, varying forms and degrees of crystallinity are possible. These variations are controlled to some extent by the choice of initiator employed. All such possible polymeric configurations are included within the scope of this invention.

The copolymers of the invention have the distinct advantage over the corresponding homopolymers of being more readily soluble in organic solvents and hence more adaptable for "dry" spinning of fibers from polymer solutions and solution-casting of films. The copolymers also have greater toughness (i.e., are less brittle) and greater elongations than the corresponding homopolymers.

The molar ratios in which the several monomers are employed and may appear in the copolymers of this invention may be varied widely. For example, binary copolymers may contain the respective monomeric units in molar ratios from 99:1 to 1:99. Ternary copolymers may vary in molar ratios in ranges from 98:1:1 to 1:98:1 to 1:1:98, etc. However, to obtain the maximum benefit of the improved solubilities characteristic of these copolymers, it is preferred that all monomer units be present in the random copolymer in at least 5 mole percent concentration. Particularly preferred are such copolymers in which each monomer unit is present in at least 10 mole percent concentration. Maximum benefits are obtained in approximately 1:1 molar binary copolymers and 1:1:1 ternary copolymers.

The copolymers of this invention are characterized by a minimum molecular weight of about 5000 and a minimum inherent viscosity of about 0.5.

A preferred group of the copolymers of the invention are those in which at least one of the monomer units has CN as $R^1$. Even more preferred are those copolymers where $R^1$ is CN or methoxycarbonyl and $R^2$ through $R^6$ are hydrogen, lower alkyl, chloro, or methoxycarbonyl.

DESCRIPTION OF THE PREFERRED EMBODIMENTS

The copolymers of this invention are prepared by reacting at least two chemically distinguishable bicyclobutane monomers in bulk, dispersion, emulsion or in solution in an inert organic solvent at a temperature of $-100°$ to $160°$ C. in the presence of an initiator selected from a free-radical generating initiator, an anionic initiator, a cationic initiator or a coordination-type initiator.

The free-radial-generating initiators may be selected from a wide variety of compounds representative of this type of initiator. Included are the azo initiators, for example, $\alpha,\alpha'$-azodiisobutyronitrile, 1,1'-azodicyclohexanecarbonitrile, dimethyl $\alpha,\alpha$-azodiisobutyrate and $\alpha,\alpha'$-azodiisobutyramide, and the organic peroxides and hydroperoxides, for example, dibenzoyl peroxide, di-t-butyl peroxide, and t-butyl hydroperoxide. The initiators can be used in proportions ranging from 0.01 to 10 weight percent of the comonomers being polymerized. Other sources of free radicals for initiating polymerization may also be used such as electron bombardment, ultraviolet light in the presence of a sensitizer, and the like.

Suitable solvents and/or dispersion media for the free-radical copolymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide, and the like. As indicated above, it is not essential that a solvent or dispersion medium be used, and bulk polymerizations can be carried out.

A wide variety of anionic initiators are operable herein for the copolymerization of two or more bicyclobutanes. Representative anionic initiators that can be used include the alkali metal alkyls, for example, n-butyllithium and methyllithium; the alkali metal alkoxides, for exampe, potassium t-butoxide and sodium methoxide; and the alkali metal aryls, for example, sodium naphthalene. The concentration of anionic initiator employed can range from 0.01 to 10 weight percent of the monomers being polymerized. The order of addition of the monomers and the initiator is not critical.

Suitable reaction media for the anionic copolymerization include ethers, for example, diethyl ether, tetrahydrofuran, and the dimethyl ether of ethylene glycol; hydrocarbons, for example, benzene and hexane; chlorinated hydrocarbons, for example, chlorobenzene; and amides, for example, dimethylformamide. The ethers are preferred.

Representative cationic initiators which may be used include boron trifluoride and trichloride, aluminum trichloride, silicon tetrafluoride, phosphorus and arsenic tri- and pentafluorides and chlorides, aluminum tribromide, titanium tetrachloride, ferric chloride and the like. The concentration of initiator may be from 0.01 to 10 weight percent of the monomers being polymerized.

Coordination-type initiators usually involve a combination of a lower valent transition metal chloride with an organometallic compound. Specific combinations which are useful include diisobutylaluminum chloride with vanadium tris(acetylacetonate), diisobutylaluminum chloride with vanadium oxychloride, triisobutylaluminum with titanium tetrachloride, methylmagnesium bromide with titanium tetrachloride, lithium aluminumtetradecyl with titanium tetrachloride and the like. The concentration of initiator may be from 0.01 to 10 weight percent of the monomers being polymerized.

Preferred reaction media for carrying out copolymerizations initiated by coordination-type catalysts are the hydrocarbons, particularly aliphatic hydrocarbons such as hexane and cyclohexane and the halogenated hydrocarbons such as tetrachloroethylene.

The reaction media for carrying out cationic-initiated copolymerizations are the same as those discussed for coordination-type copolymerizations.

Reaction times can vary from a few seconds (i.e., 5) to several days, for example, two to three days or more depending on the particular comonomers, initiator, solvent, and reaction temperature employed.

Pressures above and below atmospheric pressure are operable. Atmospheric and superatmospheric pressures are preferred.

The examples which follow illustrate the invention in greater detail. Parts are by weight unless otherwise specified.

EXAMPLE 1

A reactor, consisting of a 50 ml. round-bottom, side neck flask (fitted with a rubber septum) containing a magnetic stirring bar and equipped with a condenser, was dried by flaming out under a flow of nitrogen. In the reactor, under an atmosphere of nitrogen, were placed 1.2 g. of 2,2,3-trimethylbicyclo[1.1.0]butanecarbonitrile, 0.9 g. of 3-methylbicyclo[1.1.0]butanecarbonitrile and 18 ml. of anhydrous tetrahydrofuran. The solution was chilled to $-78°$ C. To the chilled, stirred solution was added 0.12 ml. of a 15% solution of n-butyllithium in hexane. The reaction mixture was then warmed to $0°$ C. and kept at $0°$ C. for one hour. The mixture was then poured into 237 ml. of methanol and stirred in a high-speed blender for 3 minutes. The solid was collected by filtration and was again blended with methanol and filtered. The solid was blended with water, then collected and dried in a vacuum oven for one hour to give 0.9 g. (43%) of a 1:1 copolymer in the form of a white powder. This material had an inherent viscosity of 0.08 and a M.P. of ca. $350°$ C. (dec.).

*Analysis.*—Calcd. for 1:1 copolymer: C, 78.46; H, 8.47; N, 13.07. Found: C, 76.45, 76.13; H, 7.89, 7.83; N, 13.24, 13.34.

EXAMPLE 2

Part A

To a stirred solution of 4.50 g. (0.0401 mole) of postassium t-butoxide in 30 ml. of purified tetrahydrofuran was added at $3°$ during 24 minutes a solution of 3.90 g. (0.0338 mole) of 3-chlorocyclobutanecarbonitrile in 5 ml. of tetrahydrofuran. A nitrogen atmosphere was maintained during the addition. The thick, white slurry was stirred at $0°$ for an additional 83 minutes, at which time 75 ml. of a saturated aqueous solution of potassium chloride was added. The tetrahydrofuran layer was separated and washed twice with 25 ml. portions of potassium chloride solution. The aqueous layers were backwashed with 25 ml. of tetrahydrofuran. The organic layers were dried with magnesium sulfate and distilled. A little 2,5-di-t-butylquinone was added to suppress possible radical polymerization. 1-cyanobicyclo[1.1.0]butane, 1.73 g. (65%), was obtained as a colorless liquid, B.P. $58°$ (26 mm.). The n.m.r. spectrum confirmed the assigned structure.

Part B—Copolymer of 1-cyanobicyclo[1.1.0]butane with 1-methoxycarbonylbicyclo[1.1.0]butane A solution of 4.0 g. of 1-cyanobicyclo[1.1.0]butane, 4.0 g. of 1-methoxycarbonylbicyclo[1.1.0]butane, and 0.05 g. of azobisisobutyronitrile in 40 ml. of redistilled tetramethylene sulfoxide was held at $70°$ for 16 hours under nitrogen. The clear viscous reaction mixture was cooled and poured into 350 ml. of methanol with vigorous stirring. The precipitated polymer was filtered, washed with methanol, and again stirred vigorously with 350 ml. of methanol. After drying at 75° and 1 mm. under nitrogen overnight, the white copolymer of 1-cyanobicyclo [1.1.0]butane and 1-methoxycarbonylbicyclo[1.1.0] butane weighed 6.7 g. (84%) and showed an inherent viscosity in N-methylpyrrolidone containing 5% lithium chloride of 0.89.

*Analysis.*—Calcd. for 100% yield of copolymer: N, 8.86. Calcd. for no cyano compound: N, O. Found: N, 7.71; 7.67.

The infrared spectrum confirmed the assigned structure. Films were cast from this polymer in N-methylpyrrolidone solution at 75° and dried at 1 mm. under nitrogen. They were clear and creasable.

EXAMPLE 3

Part A

A solution of 93 parts of 1-cyano-3-methylenecyclobutane in 4000 parts of methylene chloride was heated at reflux and a solution of 93 parts of $N_2O_4$ in 1300 parts of methylene chloride slowly added. Excess $N_2O_4$ was removed by distillation and 18 parts of water was added in small portions. The resulting solution was dried over silica gel and distilled at reduced pressure to obtain the mixed isomers of 1-cyano-3-hydroxy-3-nitromethylcyclobutane in the form of a viscous oil.

Part B

The viscous isomer mixture obtained in Part A was heated at reflux overnight in constant boiling aqueous hydrochloric acid. Excess water was removed by distillation at reduced pressure and the residue extracted with diethyl ether. The ether extract was freed of solvent by distillation. The residue was heated at reflux in a molar excess of methanol in the presence of a trace of sulfuric acid as catalyst. Excess alcohol was then removed by distillation and the residue extracted with diethyl ether. The ether extract was washed with aqueous sodium bicarbonate, dried over silica gel and distilled to obtain the mixed cis and trans isomers of 1,3-bis(methoxycarbonyl)-3-hydroxycyclobutane.

Part C

A mixture of 90 parts of 1,3-bis(methoxycarbonyl)-3-hydroxycyclobutane and 40 parts of pyridine was cooled at 0° C. and 60.7 parts of thionyl chloride ($SOCl_2$) was added in small portions. The resulting mass was heated for 1.5 hours at 60° C. and then at 80–100° C. for 0.5 hour. The residue was extracted three times with diethyl ether. The combined extracts were washed with water, dried over silica gel and distilled to obtain 1,3-bis (methoxycarbonyl)-3-chlorocyclobutane boiling at 72° C. at 1 mm. pressure.

Part D

A solution of 206 parts of 1,3-bis(methoxycarbonyl)-3-chlorocyclobutane in 300 parts of tetrahydrofuran was added slowly to a mixture of about 30 parts of sodium hydride in 444 parts of tetrahydrofuran, the reaction temperature being held between 25° and 50° C. About 50 parts of aqueous sodium chloride was added to decompose excess sodium hydride, followed by 150 parts of water. The residue was extracted with 500 parts of diethyl ether. The ether extract was washed with water, dried over silica gel and the ether removed by distillation. The residue was recrytsallized from 150 parts of petroleum ether. The crude crystalline product was purified by sublimation to obtain 1,3-bis(methoxycarbonyl)bicyclo[1.1.0]butane in the form of colorless crystals melting at 59.5–61.5° C.

Part E—Copolymer of 1-cyanobicyclo[1.1.0]butane with 1,3-bis(methoxycarbonyl)bicyclo[1.1.0]butane Copolymerization of 1-cyanobicyclo[1.1.0]butane, 4.0 g., with 1,3-bis(methoxycarbonyl)bicyclo[1.1.0]butane, 4.0 g., was carried out by the procedure of Example 2, Part B. The copolymer, 5.8 g. (73%), showed an inherent viscosity in N-methylpyrrolidone containing lithium chloride of 0.74.

*Analysis.*—Calcd. for 100% yield of copolymer: N, 8.86. Calcd. for no diester: N, 17.71. Found: N, 10.66; 10.81.

The infrared spectrum supported the assigned structure. A thin film of this copolymer was cast from dimethylformamide solution (20% solids) and dried. It was cut into narrow strips. Strip A was drawn 300% in boiling water, relaxed for five minutes at 140° C., and then boiled off. Strip B was extracted in hot water, drawn 400% over a metal pin at 225° C., and boiled off. Strip C was extracted in hot water, drawn 600% over a metal pin at 235° C., and boiled off. Physical properties of the three strips were determined at 90° C. and 100% relative humidity as follows:

|  | Strip A | Strip B | Strip C |
|---|---|---|---|
| Tensile strength (grams per denier) | 0.38 | 0.68 | 1.03 |
| Elongation (percent) | 32.2 | 20.0 | 14.8 |
| Initial modulus (grams per denier) | 10.3 | 14.1 | 17.3 |

EXAMPLE 4

Copolymer of 1-methoxycarbonylbicyclo[1.1.0]butane with 1,3-bis(methoxycarbonyl)bicyclo[1.1.0]butane Copolymerization of 4.0 g. of 1-methoxycarbonylbicyclo[1.1.0]butane and 4.0 g. of 1,3-bis(methoxycarbonyl)-bicyclo[1.1.0]butane was carried out exactly as described in Example 2, Part B above. The copolymer weighed 4.2 g. (53%) and showed an inherent viscosity in chloroform of 0.99.

*Analysis.*—Calcd. for $C_6H_2O_2$: C, 74.97; H, 8.39. Calcd. for $C_8H_{10}O_4$: C, 56.46; H, 5.92. Found: C, 61.50, 61.51; H, 6.96, 6.93.

The infrared spectrum was consistent with the assigned structure. A thin film of this copolymer was cast from chloroform solution (25% solids) and dried. A thin strip of this film was extracted in hot water, drawn 400% over a metal pin at 200° C., and boiled off. At 90° C. and 100% relative humidity, the strip showed a tensile strength of 0.39 gram per denier, an elongation of 273%, and an initial modulus of 0.14 gram per denier.

When different bicyclo[1.1.0]butanes shown in the table below are substituted for either or both of the bicyclo[1.1.0]butane monomers in the procedure of Example 1 or Part B of Example 2, copolymers are obtained from the following list of monomers:

TABLE bicyclo[1.1.0]butane
1-hydroxymethylbicyclo[1.1.0]butane
1,3 - bis(trifluoromethyl)-2,2,4,4-tetrafluorobicyclo[1.1.0] butane
2,4-bis(methoxycarbonyl)bicyclo[1.1.0]butane
2,4 - bis(ethoxycarbonyl) - 1 - methyl - 3 - phenylbicyclo [1.1.0] butane
1,3-dimethylbicyclo[1.1.0]butane
1-methoxycarbonylbicyclo[1.1.0]butane
1-ethoxycarbonylbicyclo[1.1.0]butane
1-carboxybicyclo[1.1.0]butane
2-carboxy-1,3-diphenylbicyclo[1.1.0]butane
1-propionyloxy-2,2,4,4-tetramethylbicyclo[1.1.0]butane
1-carbamoyl-3-methylbicyclo[1.1.0]butane
2-n-butyl - 1 - cyano-3-(9 - heptadecyl)-2-methylbicyclo [1.1.0]-butane
1 - cyano-4-cyclohexyl-2-cyclopropyl-2,3-dimethylbicyclo [1.1.0]butane 2-benzyl-1-cyano-2-methyl-3-tetradecylbicyclo[1.1.0]butane
1-cyano-3-methyl-2-(β-naphthyl)bicyclo[1.1.0]butane
1-cyano-2-(α-naphthyl)-2-phenyl-3-(1-phenyl-1-p-toyly) methylbicyclo[1.1.0]butane
1-cyano-3-(β-cyclohexylethyl)bicyclo[1.1.0]butane
1-cyano-2-cyclohexylmethyl-3-methylbicyclo[1.1.0]butane
1-phenylbicyclo[1.1.0]butane
1-p-hydroxyphenylbicyclo[1.1.0]butane
1-p-chlorophenylbicyclo[1.1.0]butane
1-ethylthiocarbonylbicyclo[1.1.0]butane
1-chlorobicyclo[1.1.0]butane
3-chloro-1-methoxycarbonylbicyclo[1.1.0]butane
1-methoxybicyclo[1.1.0]butane
1-acetoxybicyclo[1.1.0]butane
1-nitrobicyclo[1.1.0]butane
1-p-tolylsulfonylbicyclo[1.1.0]butane
1-N-ethylcarbamoylbicyclo[1.1.0]butane
1-N,N-dimethylcarbamoylbicyclo[1.1.0]butane
1-formylbicyclo[1.1.0]butane
1-(β-hydroxyethyl)bicyclo[1.1.0]butane
1-(β-chloroethyl)bicyclo[1.1.0]butane
2,4-dicyanobicyclo[1.1.0]butane
1,2,3,4-tetracyanobicyclo[1.1.0]butane
2,4-dichlorobicyclo[1.1.0]butane
2,4-bis(methylsulfonyl)bicyclo[1.1.0]butane
2,4-dinitrobicyclo[1.1.0]butane
2,4-diacetylbicyclo[1.1.0]butane
2,4-bis(diethylamino)bicyclo[1.1.0]butane
2,4-bis(n-butoxy)bicyclo[1.1.0]butane
2,4-bis(hydroxy)bicyclo[1.1.0]butane
2,4-dibromobicyclo[1.1.0]butane
2,4-diiodobicyclo[1.1.0]butane
1-acetylbicyclo[1.1.0]butane
sodium bicyclo[1.1.0]butane-1-carboxylate
1-benzoylbicyclo[1.1.0]butane The bicyclobutane monomers used in the copolymerizations are prepared as follows:

The 1-cyano-3-hydrocarbylbicyclo[1.1.0]butanes are prepared by reacting a 1-cyano-3-hydrocarbylidenecyclobutane with hydrogen iodide at 0° C. to 200° C., reacting the resulting 1-cyano-3-iodo-3-hydrocarbylcyclobutane with an alkali metal hydride suspended in a hydrocarbon oil at 0° to 100° C.

1-phenylbicyclo[1.1.0]butane is prepared by irradiating 2-phenylbutadiene with ultraviolet light.

1-(p-hydroxyphenyl)bicyclo[1.1.0]butane is prepared by irradiating 2-(p-hydroxyphenyl)butadiene with ultraviolet light.

1-(p-chlorophenyl)bicyclo[1.1.0]butane is prepared by irradiating 2-(p-chlorophenyl)butadiene with ultraviolet light.

1-ethylthiocarbonylbicyclo[1.1.0]butane is prepared by ester interchange of 1-methoxycarbonylbicyclo[1.1.0]butane with ethyl mercaptan.

1-chlorobicyclo[1.1.0]butane is prepared by irradiating 2-chlorobutadiene with ultraviolet light.

3-chloro-1-methoxycarbonylbicyclo[1.1.0]butane is prepared by treatment of 3-methoxycarbonylcyclobutanone with PCl$_5$ and dehydrochlorinating the resulting 3,3-dichloro-1-methoxycarbonylcyclobutane by the action of potassium t-butoxide in ether.

1-methoxybicyclo[1.1.0]butane is prepared by irradiating 2-methoxybutadiene with ultraviolet light.

1-acetoxybicyclo[1.1.0]butane is prepared by irradiating 2-acetoxybutadiene with ultraviolet light. It may also be prepared by peracid oxidation of 1-acetylbicyclo[1.1.0]butane.

1-nitrobicyclo[1.1.0]butane is prepared by treating 1-chloro-3-bromocyclobutane with silver nitrite and dehydrochlorinating the resulting 1-chloro-3-nitrocyclobutane by the action of potassium t-butoxide in ether.

1-p-tolylsulfonylbicyclo[1.1.0]butane is prepared by treating 1-chloro-3-bromocyclobutane with sodium p-tolylsulfinate and dehydrochlorating the resulting 1-chloro-3-p-tolylsulfonylcyclobutane by the action of potassium t-butoxide in ether.

1-(N-ethylcarbamoyl)bicyclo[1.1.0]butane is prepared by reaction of 1-methoxycarbonylbicyclo[1.1.0]butane with ethylamine.

1-(N,N-dimethylcarbamoyl)bicyclo[1.1.0]butane is prepared by reaction of 1-methoxycarbonylbicyclo[1.1.0]butane with dimethylamine.

1-formylbicyclo[1.1.0]butane is prepared by treating 3-chlorocyclobutanecarbonitrile with lithium tributoxy aluminum hydride and dehydrochlorinating the resulting 1-formyl-3-chlorocyclobutane by the action of potassium t-butoxide in ether.

1-(β-hydroxyethyl)bicyclo[1.1.0]butane is prepared by reacting 4-hydroxybut-1-yne with two equivalents of diazomethane in the presence of ultraviolet light or a copper catalyst. 1-(β-chloroethyl)bicyclo[1.1.0]butane is similarly prepared from 4-chlorobut-1-yne.

2,4-dicyanobicyclo[1.1.0]butane is prepared by treating acetylene with two equivalents of diazoacetonitrile.

1,2,3,4-tetracyanobicyclo[1.1.0]butane is prepared by treating dicyanoacetylene with two equivalents of diazoacetonitrile.

2,4-dichlorobicyclo[1.1.0]butane is prepared by treating acetylene with two equivalents of chlorodiazomethane.

2,4-bis(methylsulfonyl)bicyclo[1.1.0]butane is prepared from 2,4-dichlorobicyclo[1.1.0]butane by the action of sodium methylsulfinate.

2,4-dinitrobicyclo[1.1.0]butane is prepared by treating 2,4-dichlorobicyclo[1.1.0]butane with silver nitrite.

2,4-diacetylbicyclo[1.1.0]butane is prepared by treating acetylene with two equivalents of diazoacetone.

2,4-bis(diethylamino)bicyclo[1.1.0]butane is prepared from 2,4-dichlorobicyclo[1.1.0]butane by the action of diethylamine.

2,4-bis(n-butoxy)bicyclo[1.1.0]butane is prepared by treating 2,4-dichlorobicyclo[1.1.0]butane with potassium n-butoxide.

2,4-bis(hydroxy)bicyclo[1.1.0]butane is prepared by treating 2,4-dichlorobicyclo[1.1.0]butane with a base such as potassium hydroxide.

2,4-dibromobicyclo[1.1.0]butane is prepared by treating 2,4-dichlorobicyclo[1.1.0]butane with lithium bromide in acetone.

2,4-diiodobicyclo[1.1.0]butane is prepared by treating 2,4-dichlorobicyclo[1,1,0]butane with lithium iodide in acetone.

1-acetylbicyclo[1.1.0]butane is prepared by treating 3-chloro-1-cyanocyclobutane with methylmagnesium bromide and reacting the resulting 1-acetyl-3-chlorocyclobutane with sodium hydride in N-methylpyrrolidone.

Sodium bicyclo[1.1.0]butane-1-carboxylate is prepared by hydrolysis of 1-methoxycarbonylbicyclo[1.1.0]butane with sodium hydroxide.

1-benzoylbicyclo[1.1.0]butane is prepared by treating 3-chloro-1-cyanocyclobutane with phenylmagnesium bromide and reacting the resulting 1-benzoyl-3-chlorocyclobutane with potassium t-butoxide.

The novel copolymers of this invention can be drawn into fibers or cast into films, as shown in the examples. Thus, they are useful in fiber and film applications where clear, creasable films or fibers are needed.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A copolymer having at least a first and a second structurally different 1,3-cyclobutylene unit of the formula:

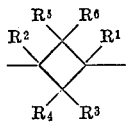

wherein:

R¹ and R² are each selected from hydrogen, halogen, hydroxyloweralkyl, hydroxyphenyl, loweralkoxyloweralkyl, loweralkoxyphenyl, haloloweralkyl, halophenyl, —COOH, —COOR, —COSR, —COOM, —CONH₂, CONHR, —CON(R)₂, —SO₂R, —CHO, —COR⁷, OCOR₇, —OR, —NO₂, —CN, or —R wherein M is one equivalent of a metal cation and R is hydrocarbyl of up to 18 carbon atoms free of ethylenic or acetylenic carbon-to-carbon unsaturation; and R³, R⁴, R⁵, and R⁶ are each selected from hydroxy, amino, —NR₂, or R¹, and R⁷ is hydrogen, hydrocarbyl of up to 18 carbon atoms or such hydrocarbyl group carrying 1–3 substituents selected from halogen or loweralkoxy, and wherein the amount of any one 1,3-cyclobutylene unit present does not exceed 95 mole percent.

2. The copolymer of claim 1 wherein R¹ is CN or methoxycarbonyl, and R² through R⁶ are hydrogen, lower alkyl, chloro, or methoxycarbonyl.

3. The copolymer of claim 1 wherein R¹ is CN, R² is hydrogen or methoxycarbonyl and R³ through R⁶ are hydrogen.

4. The copolymer of claim 1 wherein in the first 1,3-cyclobutylene unit, R¹ is —CN; R², R³ and R⁴ are methyl; and R⁵ and R⁶ are hydrogen and in the second 1,3-cyclobutylene unit, R¹ is —CN; R² is methyl; and R³, R⁴, R⁵, and R⁶ are hydrogen.

5. The copolymer of claim 1 wherein in the first 1,3-cyclobutylene unit, R¹ is —CN and R², R³, R⁴, R⁵ and R⁶ are hydrogen and in the second 1,3-cyclobutylene unit, R¹ is methoxycarbonyl and R², R³, R⁴, R⁵ and R⁶ are hydrogen.

6. The copolymer of claim 1 wherein in the first 1,3-butylene unit, R¹ is CN and R², R³, R⁴, R⁵, and R⁶ are hydrogen and in the second 1,3-butylene unit, R¹ and R² are methoxycarbonyl and R³, R⁴, R⁵ and R⁶ are hydrogen.

7. The copolymer of claim 1 wherein in the first 1,3-butylene unit, R¹ is methoxycarbonyl and R², R³, R⁴, R⁵ and R⁶ are hydrogen and in the second, 1,3-butylene unit, R¹ and R² are methoxycarbonyl and R³, R⁴, R⁵ and R⁶ are hydrogen.

References Cited

UNITED STATES PATENTS 3,234,264 2/1966 Blanchard.

OTHER REFERENCES

Ciula, Dissertation Abstracts, 21, 50–1 (1960).
Frey and Stevens, Trans. Faraday Soc. 61, 90–4 (1965).
Lemal et al., J. Am. Chem. Soc., 85, 25, 29–30 (1963).
Wiberg, Record of Chem. Progress, 26, 143–54 (1965).
Wiberg and Ciula, J. Am. Chem. Soc. 81, 5261–2 (1959).
Wiberg, et al., Tetrahedron 21, 2749–69 (1965).

JOSEPH L. SCHOFER, Primary Examiner

J. KIGHT, Assistant Examiner

U.S. Cl. X.R.

260—2, 47, 67, 79.3, 79.7, 80.3, 82.1, 83.5, 85.5, 75.7, 87.3, 87.5, 88.1, 88.2